United States Patent
Palmieri

(10) Patent No.: US 10,230,164 B2
(45) Date of Patent: Mar. 12, 2019

(54) ANTENNA POSITIONING MECHANISM

(71) Applicant: Raytheon Company, Waltham, MA (US)

(72) Inventor: Fred William Palmieri, Las Vegas, NV (US)

(73) Assignee: Raytheon Company, Waltham, MA (US)

( * ) Notice: Subject to any disclaimer, the term of this patent is extended or adjusted under 35 U.S.C. 154(b) by 184 days.

(21) Appl. No.: 15/265,289

(22) Filed: Sep. 14, 2016

(65) Prior Publication Data

US 2018/0076516 A1 Mar. 15, 2018

(51) Int. Cl.
| | | |
|---|---|---|
| *H01Q 3/04* | (2006.01) | |
| *H01Q 1/12* | (2006.01) | |
| *H01Q 3/02* | (2006.01) | |
| *F16M 11/02* | (2006.01) | |
| *H01Q 1/27* | (2006.01) | |
| *H01Q 1/28* | (2006.01) | |
| *H01Q 3/06* | (2006.01) | |

(52) U.S. Cl.
CPC .............. *H01Q 3/04* (2013.01); *H01Q 1/125* (2013.01); *H01Q 3/02* (2013.01); *F16M 11/02* (2013.01); *H01Q 1/27* (2013.01); *H01Q 1/28* (2013.01); *H01Q 3/06* (2013.01)

(58) Field of Classification Search
CPC .. H01Q 3/04; H01Q 3/08; H01Q 3/00; H01Q 1/125; H01Q 3/02
USPC ......................................... 343/765, 757, 882
See application file for complete search history.

(56) References Cited

U.S. PATENT DOCUMENTS

| | | |
|---|---|---|
| 3,202,015 A | 8/1965 | Moul, Jr. et al. |
| 3,351,946 A | 11/1967 | Verge |
| 3,383,081 A | 5/1968 | Guttenberg |
| 3,439,550 A | 4/1969 | Goulding |
| 3,747,113 A | 7/1973 | De Vellis |
| 4,238,802 A * | 12/1980 | Speicher ................ F16M 11/18 343/765 |
| 4,282,529 A | 8/1981 | Speicher |
| 4,866,456 A | 9/1989 | Ebey |
| 4,937,587 A | 6/1990 | Tsuda |
| 5,211,439 A | 5/1993 | Smith et al. |

(Continued)

FOREIGN PATENT DOCUMENTS

| | | |
|---|---|---|
| CN | 201238274 | 5/2009 |
| CN | 102820537 | 12/2012 |

(Continued)

*Primary Examiner* — Hai V Tran
(74) *Attorney, Agent, or Firm* — Renner, Otto, Boisselle & Sklar, LLP

(57) ABSTRACT

An antenna pointing mechanism for pointing an antenna includes a guide and track assembly. The guide and track assembly has a guide member fixable to a support, such as a flying vehicle, and a track member coupled to the guide member and fixable to the antenna. The track member is movable along the guide member for rotating the antenna relative to the support. The track member has a key that extends about a periphery of the antenna along a path having a portion that is non-linear. The key is received by a slot of the guide member. At each location of the track member relative to the guide member, the track member rotates about a rotational axis that is spaced from a coupling location of the track member with the guide member.

16 Claims, 5 Drawing Sheets

(56) References Cited

U.S. PATENT DOCUMENTS

| | | |
|---|---|---|
| 6,531,990 B2 | 3/2003 | Verkerk |
| 6,764,051 B2 | 7/2004 | Knight |
| 7,507,005 B1 | 3/2009 | Mier-Langner |
| 8,054,233 B2 | 11/2011 | Holt et al. |
| 9,300,039 B2 | 3/2016 | Conti et al. |
| 2002/0030631 A1 | 3/2002 | Verkerk |
| 2004/0150574 A1 | 8/2004 | Harron |
| 2009/0058745 A1 | 3/2009 | Holt et al. |
| 2011/0028871 A1 | 2/2011 | Shishido |
| 2016/0302078 A1* | 10/2016 | Sivanandar .......... H01Q 1/1228 |

FOREIGN PATENT DOCUMENTS

| | | |
|---|---|---|
| CN | 203228241 | 10/2013 |
| CN | 205116971 | 3/2016 |
| CN | 205209444 | 5/2016 |
| DE | 3704345 | 8/1988 |
| DE | 202016000543 | 3/2016 |
| EP | 0139482 A2 | 2/1985 |
| FR | 2966645 A1 | 4/2012 |
| GB | 1188578 | 4/1970 |
| GB | 1213266 | 11/1970 |
| JP | 06047396 U | 6/1994 |
| JP | 07011013 U | 2/1995 |
| JP | 08289229 A | 11/1996 |
| JP | 11088738 A | 3/1999 |
| JP | 2002 252517 A | 9/2002 |
| JP | 2008219233 A | 9/2008 |
| KR | 200341543 Y1 | 1/2004 |
| KR | 200444323 Y1 | 4/2009 |
| KR | 1020150012554 A | 2/2015 |
| KR | 20150112636 A | 10/2015 |
| WO | 2004108580 A1 | 12/2004 |
| WO | 2006033064 A2 | 3/2006 |
| WO | WO 2009/036305 A1 | 3/2009 |
| WO | 2009125533 A1 | 10/2009 |
| WO | WO 2011/108641 A1 | 9/2011 |
| WO | 2013160497 A1 | 10/2013 |
| WO | 2015155621 A1 | 10/2015 |
| WO | 2015159565 A1 | 10/2015 |

* cited by examiner

ANTENNA POSITIONING MECHANISM

FIELD OF THE INVENTION

The invention relates generally to a positioning mechanism for an antenna and more particularly to an intercoupling guide and track assembly for enabling rotational movement of an antenna.

DESCRIPTION OF THE RELATED ART

An antenna positioning mechanism is often used to allow movement of a respective antenna. Movement of the antenna may be required, for example, to track a moving target, to track a stationary target while a base structure to which the antenna is attached is moving, to avoid interference, to obtain a better signal, etc. Such antenna positioning mechanisms are often adapted for mounting to a wall, fixed pedestal, movable vehicle, etc. The mechanisms may also be adapted to provide support to the respective antenna while the antenna is stationary.

One example of an antenna positioning mechanism is a gimbal mechanism coupled between an antenna and a support surface, such as of a flight vehicle. In the case of a long antenna, for example extending along a longitudinal axis, such gimbal mechanisms, while permitting rotation of the antenna from one side to another, may allow unwanted deflection or vibration of the antenna. The deflection and vibration may result in issues with use, such as loss of beam pointing accuracy.

SUMMARY OF THE INVENTION

The present disclosure provides an exemplary antenna positioning mechanism for suspending an antenna from a support structure, and for allowing rotational freedom of the antenna about its longitudinal axis. Due to the construction of the antenna mechanism, one or more antenna mechanisms may be used with an antenna to provide axial support at one or more locations along the antenna. Such mechanism is also configured to be used with an antenna having a varying or non-constant periphery about a longitudinal axis of the antenna.

According to one aspect of the invention, an antenna pointing mechanism for pointing an antenna includes a guide and track assembly. The guide and track assembly has a guide member fixable to a support, such as a flying vehicle, and a track member coupled to the guide member and fixable to the antenna. The track member is movable along the guide member for rotating the antenna relative to the support. The track member has a key that extends about a periphery of the antenna along a path having a portion that is non-linear, where the key is received by a slot of the guide member. At each location of the track member relative to the guide member, the track member rotates about a rotational axis that is spaced from a coupling location of the track member with the guide member.

The aspect of the invention may include one or more of the features of this summary.

The guide member may include a support attachment portion coupled to the support, where at each respective location of the track member relative to the guide member, the rotational axis is distanced from the support attachment portion by a distance equal to or greater than the smallest radius of the track member, the radius being defined from the rotational axis at said respective location of the track member, to the coupling location of the track member with the guide member.

The path along which the key extends may be a non-circular path.

The track member may rotate about a non-fixed rotational axis.

The key may have a non-constant radius of curvature.

The guide member may include an elastomeric portion at least partially defining the slot.

The track member may be fixable about an outer periphery of the antenna.

The guide and track assembly may further include an actuating mechanism coupled between the guide member and the track member for driving rotation of the track member along the guide member.

The guide and track assembly may be in combination with the antenna to which the track member is fixable, the antenna extending longitudinally along the rotational axis a distance greater than a diameter of the track member through the rotational axis.

The guide and track assembly may be a primary guide and track assembly that is further in combination with one or more additional guide and track assemblies, the one or more additional guide and track assemblies being spaced axially along the antenna from the primary guide and track assembly.

According to another aspect of the invention, an antenna pointing mechanism for pointing an antenna includes a track member fixable about a periphery of the antenna and having a non-constant radius of curvature. A guide member is fixable to a support and coupled to the track member. One of the guide member and the track member has a slot that is configured to receive a key of the other of the guide member and the track member, the slot and key configured to support movement of the track member relative to the guide member.

The another aspect of the invention may include one or more of the features of this summary.

The track member may rotate about a rotational axis, and a portion of the track member may be disposed between the rotational axis and the guide member at each location of the track member relative to the guide member.

The track member of non-constant curvature may rotate about a non-fixed rotational axis, and at each respective location of the track member relative to the guide member, the rotational axis may be spaced from a coupling location of the track member and the guide member.

The key or slot of the track member has a non-constant radius of curvature.

The guide member may include an elastomeric portion at least partially defining the key or slot of the guide member.

The antenna pointing mechanism may further include an actuating mechanism coupled between the guide member and the track member for driving rotation of the track member along the guide member.

The antenna pointing mechanism may be in combination with the antenna about which the track member is fixable, the antenna extending longitudinally along the rotational axis a distance greater than a diameter of the track member through the rotational axis.

The antenna pointing mechanism may be a primary antenna pointing mechanism that is further in combination with one or more additional antenna pointing mechanisms, the one or more additional antenna pointing mechanisms spaced axially along the antenna from the primary antenna pointing mechanism.

According to still another aspect of the invention, a guide and track assembly for a pointing an antenna includes a guide member fixable to a support, and a circular track member coupled to the guide and fixable to the antenna. The track member is movable along the guide member for rotating the antenna relative to the support. The track member has a key for extending about a periphery of the antenna along a circular path. The key is received by a slot of the guide member. The track member rotates about a rotational axis. A portion of the track member is disposed between the rotational axis and the guide member at each location of the track member relative to the guide member.

The still aspect of the invention may include one or more of the features of this summary.

The guide and track assembly may be in combination with the antenna, the circular track being fixed about a periphery of the antenna.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present invention provides a positioning mechanism for an antenna that enables freedom of rotation of the antenna about a rotational axis, such as a longitudinal axis of the antenna. Construction of the positioning mechanism enables such an antenna to be suspended in any suitable orientation without requiring support of the antenna along the rotational axis, thereby minimizing complexity of the suspension.

It will be appreciated that the positioning mechanism may be used with communications or sensing equipment for sending or receiving signals, such as a linear radar array, GPS, weather or atmospheric sensor, electro-optical sensor, infrared sensor, or any other suitable camera.

Figure 1:
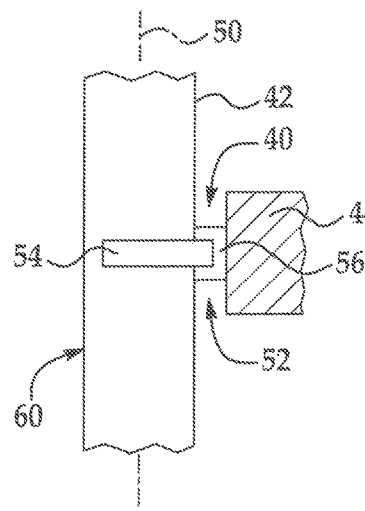
FIG. 1 is a schematic environmental view of an antenna positioning mechanism according to the invention, shown in combination with an antenna.
Figure 2:
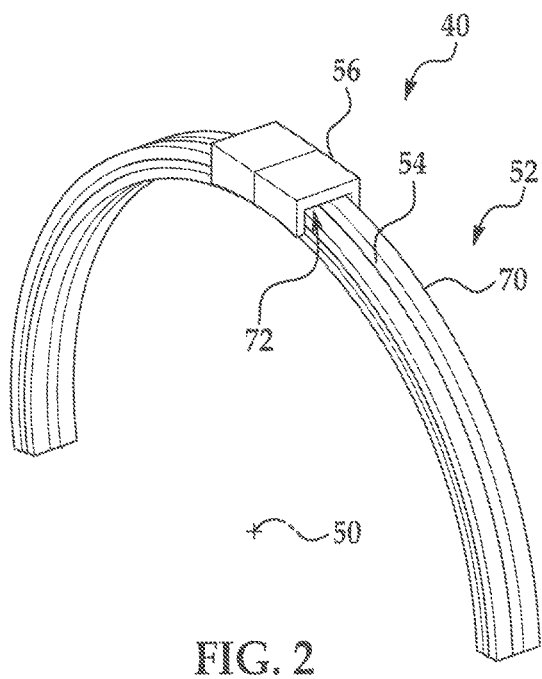
FIG. 2 is a perspective view of the antenna positioning mechanism shown in FIG. 1.

Turning first to FIG. 1, an antenna positioning mechanism 40 is shown in use with a linear radar antenna 42. The antenna positioning mechanism 40 is coupled between a support structure 44 and the radar antenna 42. With respect to FIG. 1, the support structure 44 may be any suitable structure, such as a projection of a wing or the fuselage of a flight vehicle, such as a UAV.

The antenna positioning mechanism 40 enables suspension of the radar antenna 42 from the support structure 44. The antenna positioning mechanism 40 also enables rotation of the antenna 42 about a rotational axis 50 of each of the antenna positioning mechanism 40 and the antenna 42, along which the antenna 42 extends. In this way, the antenna 42 is supported for rotation other than at the rotational axis 50.

As depicted, the rotational axis 50 is the central longitudinal axis of the antenna 42. The axes may be separate in other embodiments with differing antenna construction, such as differing in antenna profile.

The antenna 42 may be of any suitable length, size or shape, having any suitable cross-sectional shape. While the antenna 42 is disclosed as having a cylindrical cross-section, the antenna 42 may be a different cross-sectional shape in some embodiments. For example, the antenna 42 may have one or more flats extending along a portion or all of the rotational axis 50.

Turning now to FIGS. 1-4, the antenna positioning mechanism 40 includes a guide and track assembly 52 having a guide member 56 and a track member 54 intercoupled with one another. The antenna 42 extends longitudinally along the rotational axis 50 a distance greater than a diameter of the track member 54 through the rotational axis 50.

The track member 54 is fixable to the antenna 42, and as shown, is wrapped about an outer periphery 60 of the antenna 42. The track member 54 may be fixed to the antenna 42 via any suitable means, such as by welding or other bonding, or by fasteners such as threaded bolts or rivets.

The depicted track member 54 extends partially circumferentially about the antenna 42. As shown, the track member 54 is circular and has a constant radius of curvature.

Correspondingly, at least the portion of the outer periphery 60 of the antenna 42 to which the track member 54 is fixed is also circular. It will be appreciated in other embodiments that a circular track member 54 may be sized for being fixed to an antenna having a non-circular profile at the location of attachment of the track member 54 along the rotational axis 50.

While the track member 54 is not shown as extending fully circumferentially about the antenna 42, it may extend fully circumferentially about an antenna in some embodiments. For example, in some embodiments, the track member 54 may be configured to extend 360 degrees about an antenna 42, or any suitable extent that is less than 360 degrees.

Figure 3:
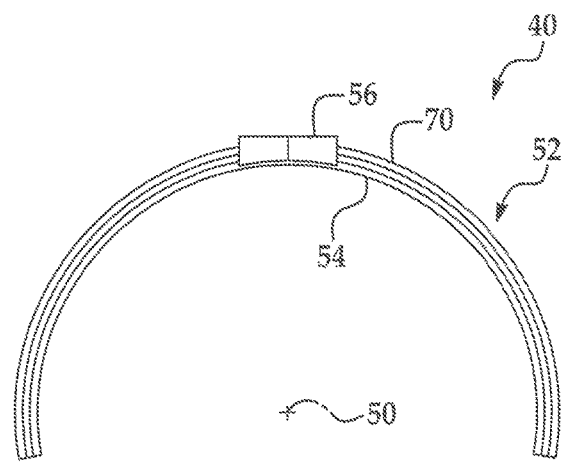
FIG. 3 is a top elevational view of the antenna positioning mechanism shown in FIG. 1.
Figure 4:
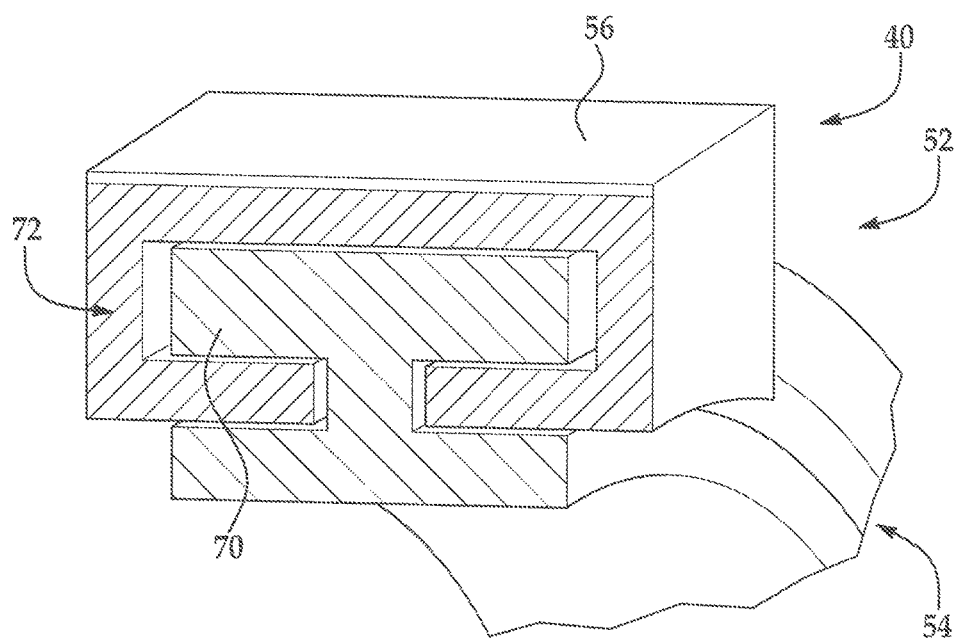
FIG. 4 is a cross-sectional perspective view of the antenna positioning mechanism shown in FIG. 1.
Figure 5:
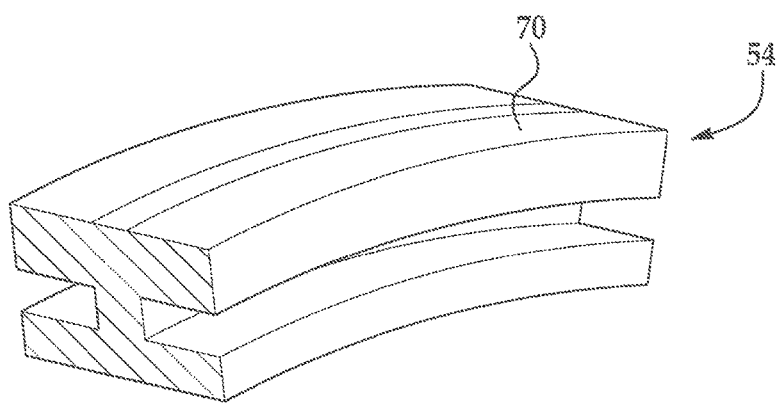
FIG. 5 is a perspective view of the track member of the antenna positioning mechanism shown in FIG. 1.

Referring to FIGS. 3-5, the track member 54 is coupled to the guide member 56, such as via a key and slot arrangement. The depicted key and slot arrangement is provided for moving the track member 54 and the antenna 42 relative to the guide member 56 and support structure 44. In the depicted embodiment, the track member 54 includes a key 70 that is received in a slot 72 of the guide member 56.

In other embodiments, it will be appreciated that a track member may include a slot and a guide member may include a corresponding key.

The key 70 of the illustrated track member 54 is shaped to move along the guide member 56. The key 70 has a cross-sectional profile, as shown in FIGS. 4 and 5, that is shaped to be captured by the slot 72. The intercoupling of the key 70 and slot 72 prevents separation of the track member 54 from the guide member 56 both along the rotational axis 50 and in a direction orthogonal the rotational axis 50. While the profile is depicted as T-shaped, other profiles may be suitable in other embodiments.

The key 70 extends about the rotational axis 50 and about the outer periphery 60 of the antenna 42 along a path that is at least partially non-linear. As illustrated, the key 70 extends along a path that is fully non-linear (non-linear fully along its length), and in particular is a circular path.

With respect to the guide member 56, the key 70 extends other than about the guide member 56. For example, at each location of the track member 54 relative to the guide member 56, a portion of the track member 54 is disposed between the rotational axis 50 and the guide member 56. Put another way, at each respective location of the track member 54 relative to the guide member 56, the rotational axis 50 is distanced from a fixing location of the guide member 56 to the support 44, by a distance equal to or greater than the smallest radius of the track member 54. In such case, the radius is defined from the rotational axis 50 at said respective location of the track member 54, to the coupling location of the track member 54 with the guide member 56.

Figure 6:
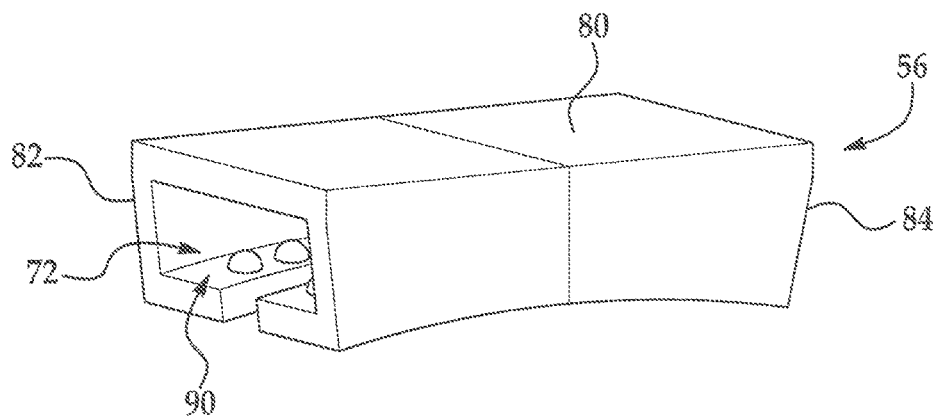
FIG. 6 is a perspective view of the guide member of the antenna positioning mechanism shown in FIG. 1.
Figure 7:
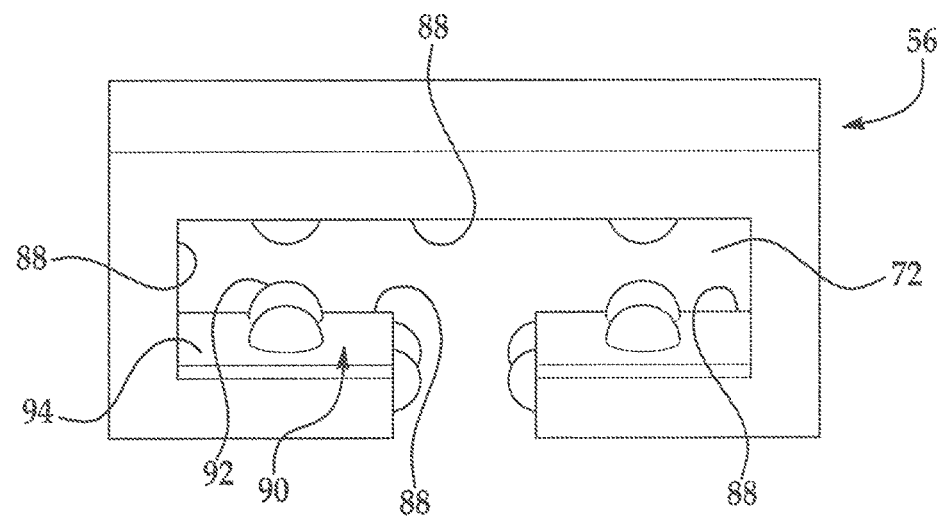
FIG. 7 is a side elevational view of the guide member of the antenna positioning mechanism shown in FIG. 1.

Turning next to FIGS. 6 and 7, the guide member 56 is configured to be fixed to the support 44. A support portion 80 of the guide member 56 is fixable to the support 44 by any suitable means, for example via welding or other bonding, or via fasteners such as threaded members or rivets.

The guide member 56 is also configured, such as being shaped, to engage the radially outer key 70 of the track member 54 and to allow rotation of the track member 54, such as about the rotational axis 50, relative to the guide member 56. The slot 72 has a T-shaped cross-sectional profile for receiving the T-shaped cross-sectional profile of the key 70.

The slot 72 and key 70 may have alternative corresponding cross-sectional profiles in other embodiments.

The slot 72 of the guide member 56 extends fully through the guide member 56 between opposed axial ends 82 or 84. As depicted, the slot 72 may extend other than linearly between the opposed axial ends 82 and 84, for corresponding to a radius of curvature of the key 70 of the track member 54.

The guide member 56 includes slot walls 88 defining the slot 72. A portion of the guide member 56 defining the slot 72, such as a portion of the slot walls 88, may include an elastomeric material. In this way, the guide member 56 may be better prevented from binding with the track member 54 during movement of the track member 54. Such elastomeric material may also allow for use with a track member 54 having a non-constant radius of curvature, or a transitioning radius of curvature, by enabling a single guide member 56 to traverse key portions of different curvatures.

Where the guide member 56 includes an elastomeric material, it will be appreciated that the slot 72 may instead extend linearly between the opposed axial ends 82 and 84.

Alternatively, or in combination with the elastic material, the guide member 56 may include one or more friction-reducing elements. As shown, the guide member 56 includes ball bearing inserts 90 for engaging outer surfaces of the key 70. Such ball bearing inserts 90 may include ball bearings 92 that are spring-biased towards a center of the guide member 56. The ball bearing inserts 90 may also include containment members 94 that are coupleable to an inner surface of the guide member 56 for retaining the ball bearings 92 against the guide member 56.

In some embodiments, low friction bearing surfaces may be integral with the remainder of the guide member 56. In some embodiments, the guide member 56 may additionally or alternatively include polytetrafluoroethylene (PTFE) surfaces, roller bearings, etc., for reducing friction caused by movement of the track member 54 relative to the guide member 56.

Figure 8:
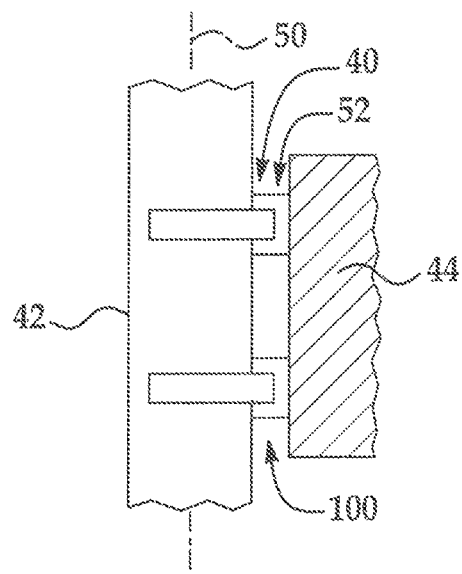
FIG. 8 is another schematic environmental view of the antenna positioning mechanism of FIG. 1, shown in combination with another antenna positioning mechanism according to the invention and an antenna.

Looking next to FIG. 8, the antenna positioning mechanism 40 is shown in combination with the antenna 42, the support 44, and yet another antenna positioning mechanism 100. The antenna positioning mechanism 100 is depicted as being the same as the antenna positioning mechanism 40. The antenna positioning mechanisms 40 and 100 are axially spaced from one another along the antenna 42, along the rotational axis 50.

Any number two or more axially-spaced-apart antenna positioning mechanisms may be used. Using two or more such antenna positioning mechanisms may decrease vibration or deflection along the antenna 42, such as in response to weather conditions, atmospheric conditions, or movement of the support structure to which the antenna 42 is attached.

It will be appreciated that the antenna positioning mechanisms 40 and 100 may have respective track members having different profiles, as seen from a view taken orthogonally through the rotational axis 50.

Figure 9:
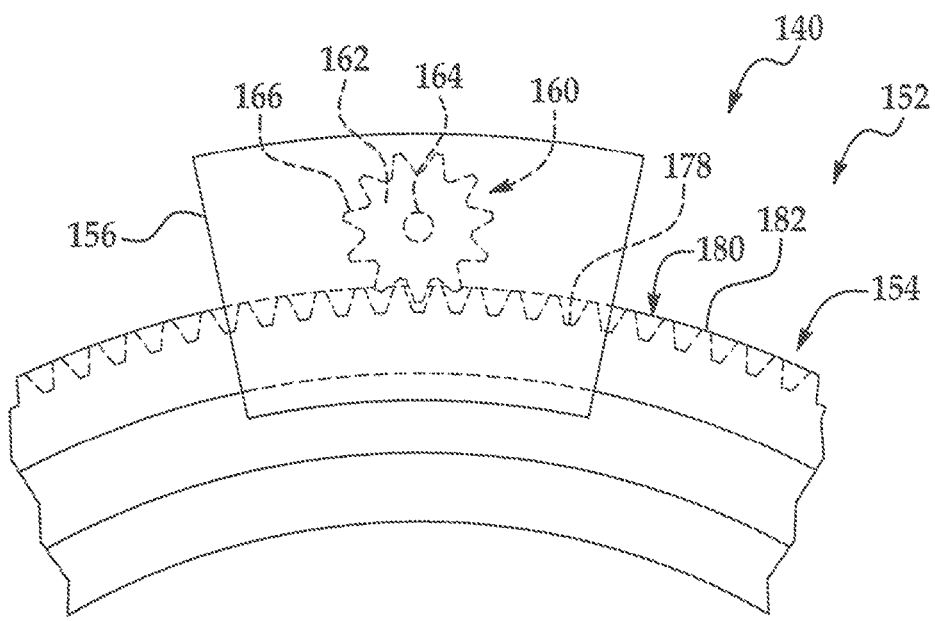
FIG. 9 is a partial top elevational view of yet another antenna positioning mechanism according to the invention.

Turning now to FIG. 9, an alternative guide and track assembly is shown at 152. It will be appreciated that aspects of the guide and track assemblies 52 and 152 may be similar to one another, and/or may be substituted for one another or used in conjunction with one another where applicable.

The guide and track assembly 152 of the antenna pointing mechanism 140 includes a drive mechanism 160, also herein referred to as an actuating mechanism 160. As depicted, the drive mechanism 160 is at least partially contained in the guide member 156 and includes a gear 162 rotatable about or with an axle 164. The axle 164 is coupled in the guide member 156. The gear 162 includes one or more teeth 166 disposed about a circumferential periphery of the gear 162, such as being equally circumferentially spaced apart.

The gear 162 may be driven by any suitable motive device (not shown), such as a high precision, zero backlash electric motor. The gear 162 may be coupled to a rotatable output member of the motive device such as via an intermediary gear, a belt disposed about the axle 164 or gear 162, or the axle 164 being the output member of the motive device.

The teeth 166 of the gear 162 are shaped to engage roots 178 of a toothed surface such as a rack 180 of the track member 154. As depicted, the rack 180 is disposed at a radially outer location of the track member 154, particularly of the key 170 of the track member 154. The teeth 166 of the gear 162 and teeth 182 of the rack 180 may be sized and spaced apart in a configuration enabling high rotational precision of the track member 154 and associated antenna.

Figure 10:
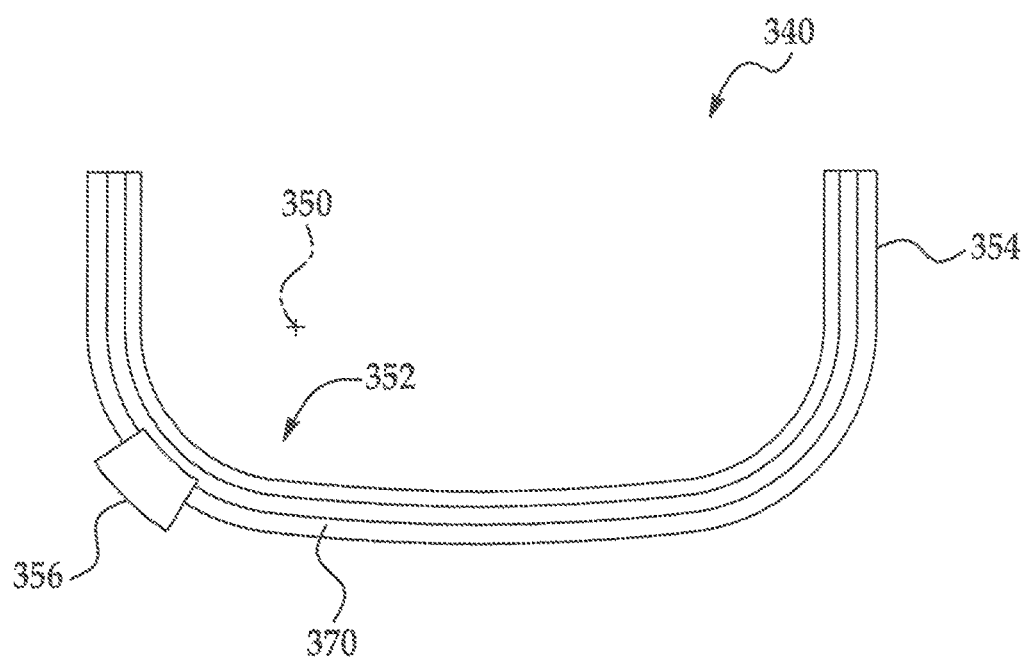
FIG. 10 is a top elevational view of still another antenna positioning mechanism according to the invention.
Figure 11:
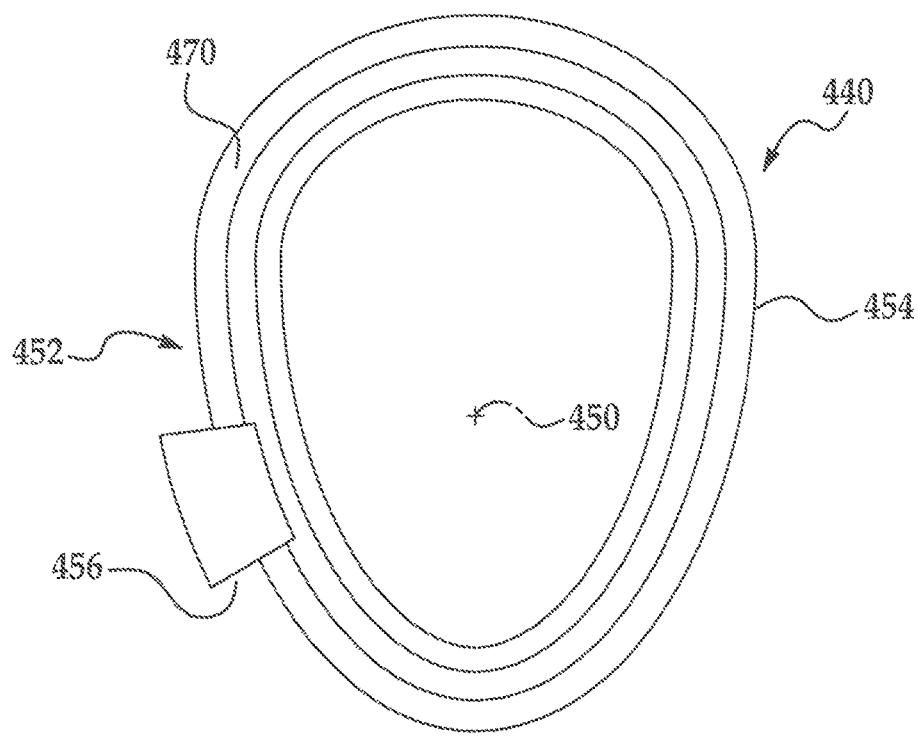
FIG. 11 is a top elevational view of a further antenna positioning mechanism according to the invention.

Turning next to FIGS. 10 and 11, alternative antenna positioning mechanisms 340 and 440 are respectively shown having respective guide and track assemblies 352 and at 452. It will be appreciated that aspects of the guide and track assemblies 52, 352 and 452 may be similar to one another, and/or may be substituted for one another or used in conjunction with one another where applicable.

Each of the guide and track assemblies 352 and 452 has a respective track member 354 or 454, each having a non-constant radius of curvature. Each has a respective key 370 or 470 that extends along a non-linear path, which is also a non-circular path. Further, each of the track members 354 and 454 rotates about a respective non-fixed rotational axis 350 or 450.

Particularly, the track member 354 of FIG. 10 has linear and curved portions, and curved portions of differing respective radii of curvature. The track member 354 extends only partially about the rotational axis 350. The guide member 356 may include an elastomeric material defining a portion of a respective slot for enabling the transition between these linear and curved portions. One of the track member 354 or the guide member 356 may include balls or roller bearings.

As the track member 354 moves along the guide member 356, such as rotating relative to the guide member 356, the rotational axis 350 of the track member 354 moves. Nonetheless, the rotational axis 350 is spaced from the coupling location of the track member 354 and the guide member 356 at each position of the track member 354 relative to the guide member 356. Further, a portion of the track member 354 is disposed between the rotational axis 350 and the guide member 356 at each location of the rotational axis 350.

Similarly, the track member 454 of FIG. 11 has linear and curved portions, and curved portions of differing respective radii of curvature. The guide member 456 may include an elastomeric material defining a portion of a respective slot for enabling the transition between these linear and curved portions. The track member 454 extends fully about the rotational axis 450. One of the track member 454 or the guide member 456 may include balls or roller bearings.

As the track member 454 moves along the guide member 456, such as rotating relative to the guide member 456, the rotational axis 450 of the track member 454 moves. Nonetheless, the rotational axis 450 is spaced from the coupling location of the track member 454 and the guide member 456 at each position of the track member 454 relative to the guide member 456. Further, a portion of the track member 454 is disposed between the rotational axis 450 and the guide member 456 at each location of the rotational axis 450.

In summary, an antenna pointing mechanism 40, 140, 340, or 440 for pointing an antenna 42 includes a guide and track assembly 52, 152, 352 or 452. The guide and track assembly 52, 152, 352 or 452 has a guide member 56, 156, 356 or 456 fixable to a support 44, such as a flying vehicle, and a track member 54, 154, 354 or 454 coupled to the guide member 56, 156, 356 or 456 and fixable to the antenna 42. The track member 54, 154, 354 or 454 is movable along the guide member 56, 156, 356 or 456 for rotating the antenna 42 relative to the support 44. The track member 54, 154, 354 or 454 has a key 70, 170, 370 or 470 that extends about a periphery 60 of the antenna 42 along a path having a portion that is non-linear. The key 70, 170, 370 or 470 is received by a slot 72, 172, 372 or 472 of the guide member 56, 156, 356 or 456. At each location of the track member 54, 154, 354 or 454 relative to the guide member 56, 156, 356 or 456, the track member 54, 154, 354 or 454 rotates about a rotational axis 50, 150, 350 or 450 that is spaced from a coupling location of the track member 54, 154, 354 or 454 with the guide member 56, 156, 356 or 456.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A guide and track assembly for pointing an antenna, the guide and track assembly comprising:
   a guide member fixable to a support; and
   a track member coupled to the guide member and fixable to the antenna, the track member being movable along the guide member for rotating the antenna relative to the support;
   wherein the track member has a key that extends about the antenna along a path having a portion that is non-linear, the key being received by a slot of the guide member, and
   wherein, at each location of the track member relative to the guide member, the track member rotates about a rotational axis that is spaced from a coupling location of the track member with the guide member,
   wherein the path along which the key extends is a non-circular path, and
   wherein the track member rotates about a non-fixed rotational axis.

2. The guide and track assembly of claim 1,
   wherein the guide member includes a support attachment portion coupled to the support, and
   wherein at each respective location of the track member relative to the guide member, the rotational axis is distanced from the support attachment portion by a distance equal to or greater than the smallest radius of the track member, the smallest radius being defined from the rotational axis at said respective location of the track member, to the coupling location of the track member with the guide member.

3. The guide and track assembly of claim 1, wherein the key has a non-constant radius of curvature.

4. The guide and track assembly of claim 1, wherein the guide member includes an elastomeric portion at least partially defining the slot.

5. The guide and track assembly of claim 1, wherein the track member is fixable about an outer periphery of the antenna.

6. The guide and track assembly of claim 1, further including an actuating mechanism coupled between the guide member and the track member for driving rotation of the track member along the guide member.

7. The guide and track assembly of claim 1, in combination with the antenna to which the track member is fixable, the antenna extending longitudinally along the rotational axis a distance greater than a diameter of the track member through the rotational axis.

8. A guide and track assembly for pointing an antenna, the guide and track assembly comprising:
 a guide member fixable to a support; and
 a track member coupled to the guide member and fixable to the antenna, the track member being movable along the guide member for rotating the antenna relative to the support;
 wherein the track member has a key that extends about the antenna along a path having a portion that is non-linear, the key being received by a slot of the guide member,
 wherein, at each location of the track member relative to the guide member, the track member rotates about a rotational axis that is spaced from a coupling location of the track member with the guide member,
 in combination with the antenna to which the track member is fixable, the antenna extending longitudinally along the rotational axis a distance greater than a diameter of the track member through the rotational axis, and
 wherein the guide and track assembly is a primary guide and track assembly that is further in combination with one or more additional guide and track assemblies, the one or more additional guide and track assemblies being spaced axially along the antenna from the primary guide and track assembly.

9. An antenna pointing mechanism for pointing an antenna, the antenna pointing mechanism comprising:
 a track member fixable about a periphery of the antenna and having a non-constant radius of curvature; and
 a guide member fixable to a support and coupled to the track member,
 wherein one of the guide member and the track member has a slot that is configured to receive a key of the other of the guide member and the track member, the slot and key configured to support movement of the track member relative to the guide member, and
 wherein the track member of non-constant curvature rotates about a non-fixed rotational axis.

10. The antenna pointing mechanism of claim 9, wherein the track member rotates about a rotational axis, and wherein a portion of the track member is disposed between the rotational axis and the guide member at each location of the track member relative to the guide member.

11. The antenna pointing mechanism of claim 9, wherein at each respective location of the track member relative to the guide member, the rotational axis is spaced from a coupling location of the track member and the guide member.

12. The antenna pointing mechanism of claim 9, wherein the key or slot of the track member has a non-constant radius of curvature.

13. The antenna pointing mechanism of claim 9, wherein the guide member includes an elastomeric portion at least partially defining the key or slot of the guide member.

14. The antenna pointing mechanism of claim 9, further including an actuating mechanism coupled between the guide member and the track member for driving rotation of the track member along the guide member.

15. The antenna pointing mechanism of claim 9, in combination with the antenna about which the track member is fixable, the antenna extending longitudinally along the rotational axis a distance greater than a diameter of the track member through the rotational axis.

16. An antenna pointing mechanism for pointing an antenna, the antenna pointing mechanism comprising:
 a track member fixable about a periphery of the antenna and having a non-constant radius of curvature; and
 a guide member fixable to a support and coupled to the track member,
 wherein one of the guide member and the track member has a slot that is configured to receive a key of the other of the guide member and the track member, the slot and key configured to support movement of the track member relative to the guide member,
 in combination with the antenna about which the track member is fixable, the antenna extending longitudinally along the rotational axis a distance greater than a diameter of the track member through the rotational axis, and
 wherein the antenna pointing mechanism is a primary antenna pointing mechanism that is further in combination with one or more additional antenna pointing mechanisms, the one or more additional antenna pointing mechanisms spaced axially along the antenna from the primary antenna pointing mechanism.

\* \* \* \* \*